Patented June 1, 1948

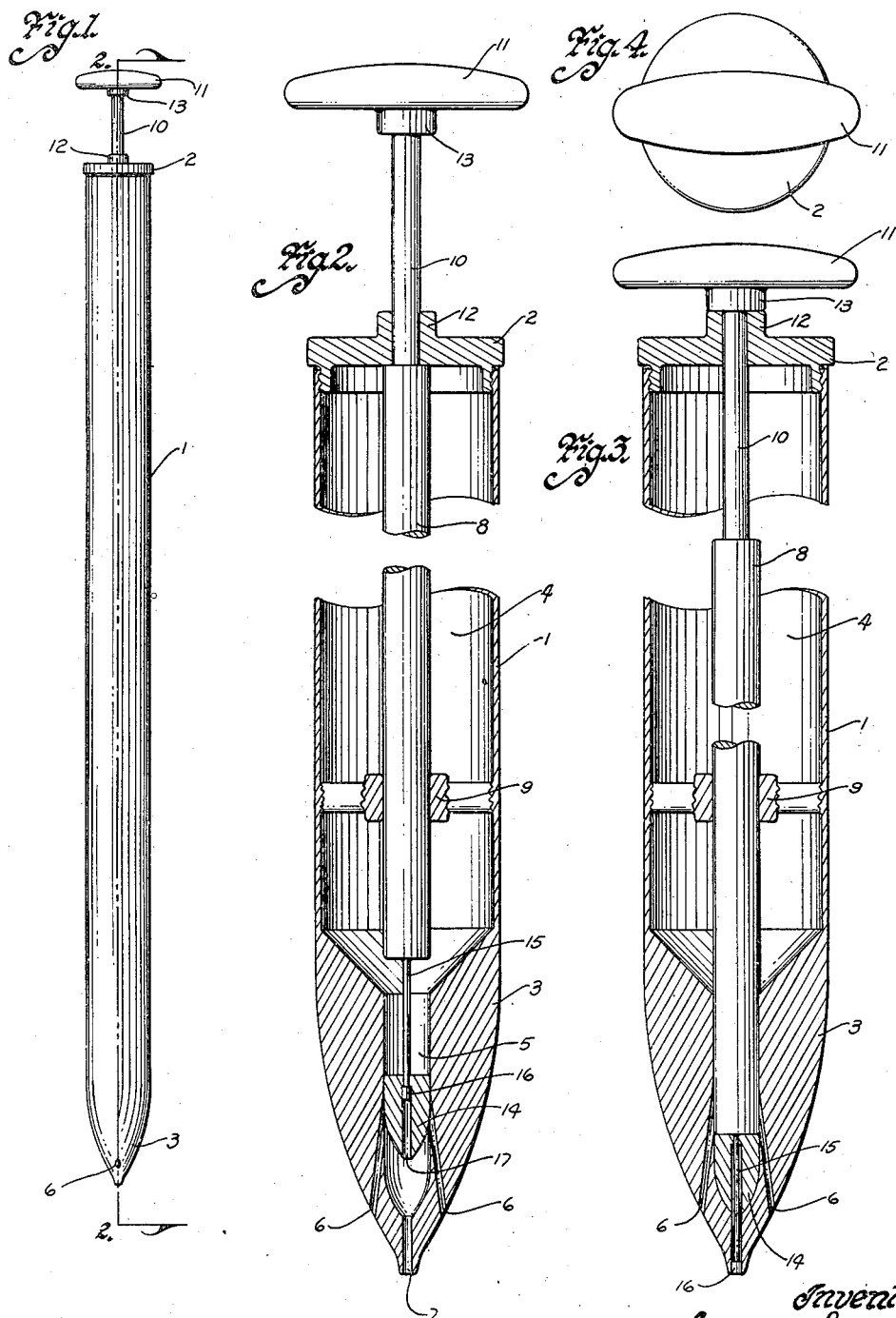

2,442,703

UNITED STATES PATENT OFFICE 2,442,703

INJECTOR GUN

Charles A. Martin, Patterson, Iowa

Application July 8, 1946, Serial No. 682,085

6 Claims. (Cl. 47—49)

This invention relates to a new and novel pump means showing one use of the pump means in an injector gun and more particularly an injector gun to be inserted into the stem of a plant to be destroyed or into the root system of a plant and a plant killer compound injected into the plant from the gun.

Many new substances have been found in the past few years that selectively destroy or kill plants, particularly broad leaf plants such as thistles, dandelions, vines, poison ivy, etc. The particular substances all act somewhat on the same principle. They are all hormones that stimulate and accelerate the growth of the root system of the plants. The growth is so accelerated that the roots burst which causes the plant to die. The roots and plant stock then wither and deteriorate and provide fertilizer for the soil by decomposition.

In the present use of these new substances which generally come in powdered form, they are mixed with a liquid such as water, and sprayed or sprinkled on or around the plant it is desired to destroy. It is very expensive to dust the powder on plants in that so much of the powder is lost and does not reach the point desired. With the dusting on of the powder or spraying or sprinkling of the powder in a liquid form, plants other than the undesirable plants are covered with the substance and desirable plants such as clover in a lawn may be destroyed when dusting, sprinkling or spraying to kill dandelions. In dusting, sprinkling or spraying the substance containing the hormone that stimulates root growth must enter the plant through the leaves and stock and thus proceed to the root system. Small leaf plants that are undesirable will not assimilate sufficient of the plant killer to kill the root system when sprayed, sprinkled or dusted in view of their small exposed surface. If the plant killer were entered directly into the root system there is every reason to believe that sufficient plant killer could be entered into the plant to kill the same. To sprinkle, spray or dust is time consuming in that it takes some period of time before the substance reaches the root system in the normal functioning of the plant. Further the substance must be put on the plant six to eight hours before a rain or it may be washed off and never reach the root system; and with sprinkling and spraying more of the hormone substance is placed on the plant than necessary to kill plant life. The liquid substance cannot be applied in temperatures over 70° F. on account of evaporation losses. Many substances in a liquid form have been found that kill undesirable plant life and the present invention is directed to a means and method of applying a plant killer substance in a liquid form to a plant that is undesirable and should be destroyed.

It is an object of the invention among others to provide a pump means that dispenses a measured quantity of liquid each time it is operated; a pump means simple in operation and requiring no special skill on the part of an operator to operate; a pump means wherein leakage is reduced to a minimum; and a pump means that is simple and economical in construction and durable and long lasting in operation.

It is a further object of the invention among others, to provide a means to dispense a liquid plant killer substance that is selective in that it can be used to kill only the undesirable plant life; a means to enter a plant killer substance at the point in the plant where it starts to work immediately to kill the plant; a means that is economical in that it gets the liquid plant killer substance to the plant in the minimum quantity needed to kill the plant; a means that provides a better and cheaper method of application; a means that inserts the plant killer substance into an undesirable plant at any time regardless of temperature or moisture conditions and still proves effective; a means that gets all the plant killer substance into the ground where it acts as a fertilizer itself; a means that is simple and economical in construction and durable and long lasting in operation, and a means requiring no special skill on the part of an operator to operate.

In the carrying out of one of the objects of the invention there is provided a pump comprising a first chamber to hold a liquid and closed at the top thereof. A second chamber is provided in the casing below the first chamber and is in communication with the first chamber. A plunger is slidable within the casing and extends through the top of the casing with the lower portion of the plunger fitting into the second chamber when the plunger is moved downwardly. An exit is provided from the second chamber to the exterior of the casing. The plunger fits snugly into the second chamber when moved downwardly and closes off communication between the first and second chambers. There are means to close off the exit which may be connected to the plunger and close off the exit when the plunger is in its uppermost position. These means may take the form of a second plunger which is movably connected to the first mentioned plunger by a bolt with the second mentioned plunger being slidable on the bolt. The second plunger seats in the bottom of the second chamber with the bolt extending through the second mentioned plunger member as the first mentioned plunger extends downwardly to exhaust liquid from the second chamber through the exit. A head is provided on the bolt to lift the second mentioned plunger upwardly to close the exit when the first mentioned plunger is in its uppermost position. The lower portion of the casing has an opening to receive the bolt after it has passed through the second plunger member.

In a further carrying out the objects of the invention there is provided an injector gun comprising a casing forming a chamber to hold a liquid with the casing being closed at the top thereof; a removable cap being one means of closure and the lower end of the casing being pointed. There is included a second chamber within the pointed lower end of the casing which is in communication with the first chamber. A plunger is slidable within the casing and extends through the top of the casing with the lower portion of the plunger fitting into the second chamber when moved downwardly. Openings lead from the second chamber to the exterior of the casing to provide an exit from the second chamber. The plunger fits snugly into the second chamber when moved downwardly and closes off communication between the first and second chambers. There are means which may be connected with the plunger to close off the openings in the lower end portion of the casing when the slidable plunger is in its uppermost position and may take the form of a second plunger slidable in the second chamber. The second plunger is movably connected to the first plunger as by a bolt with the second plunger being slidable on the bolt. The second plunger seats in the bottom of the second chamber with the bolt extending through the second plunger member as the first mentioned plunger extends downwardly to exhaust liquid from the second chamber through the openings. A head is provided on the bolt to lift the second plunger upwardly to close the openings when the first plunger is in its uppermost position. The bottom portion of the casing has an opening therein to receive the bolt after it has passed through the second plunger member.

With the foregoing and other objects in view, the invention will be more fully described hereinafter and will be particularly pointed out in the claims appended hereto.

In the drawings, wherein like symbols refer to like or corresponding parts throughout the several views:

Figure 1 is an elevational view showing the pump means in an injector gun.

Figure 2 is a sectional view of the injector gun, broken away in the center, taken on the line 2—2 of Figure 1 showing the pump means with plungers in their uppermost position.

Figure 3 is a sectional view of the injector gun, broken away in the center, taken on the line 2—2 of Figure 1 showing the pump means with both plungers in their lowermost position.

Figure 4 is a top plan view of the injector gun.

Referring to Figure 1, there is disclosed a casing 1 which is closed at the top and as shown in Figure 1 may be by a removable cap 2. Figures 2 and 3 show the cap 2 as screw threaded to casing 1 but it may be removably attached by any other suitable means such as a bayonet slot joint. The lower end of the casing tapers to a pointed end as shown at 3, when the pump is placed in an injector gun but may be other shapes when the pump is used for other purposes and need not taper to a point.

The casing 1 forms a chamber 4 within the casing to receive any liquid such as plant killer substance when used in an injector gun. Cap 2 is removed from the top of casing 1 to enter liquid into chamber 4 when the liquid has been entirely dispensed. There is a second chamber 5 within the casing 1 located within the lower end of the casing and as in Figure 2 is in the tapered lower end portion 3 of the casing 1. The lower end portion 3 may be cast of any desirable metal or a plastic and attached to casing 1 which may be a conduit of any size and length desirable, depending upon the quantity of liquid it is determined is needed for any particular operation. Casing 1 may be of metal or plastic as there is nothing corrosive about plant killer powders in water hence no special metal or plastic is needed. When using the pump in an injector gun, the lower portion 3 has an opening or a series of side openings 6, one of which is represented at 6 in Figure 1 and others in Figures 2 and 3 which connect the second chamber 5 with the exterior of the casing 1 to provide an exit. The opening 6, or openings 6, may be drilled as the lower end 3 is solid and may be located at any point or points desired. Also drilled into the middle of the lower end 3 upwardly is an opening 7 the purpose of which will be described later and which opening also communicates with the second chamber 5.

A plunger member 8 is slidably supported within the casing 1 by a supporting member 9 within the casing 1 and by cap 2. The plunger 8 extends through cap 2 and a portion 10 of the plunger 8 extends above cap 2 and is of a smaller diameter than the main body 8 of the plunger. In the uppermost position of the plunger 8 is the casing 1, the plunger portion 8 contacts the underside of cap 2 and further upward movement of the plunger is prevented. The plunger 8 may be made all one diameter and any suitable stop means, such as a pin put on the plunger 8 to limit upward movement if it is desired to lower cost of manufacture. The plunger 8 has a handle 11 on the top of the portion 10 of the plunger 8 by which the gun is carried and by which the plunger 8 is forced up and down within the casing 1. The cap 2 carries an upward projection 12 while the handle 11 carries a downward projection 13. When the plunger 8 is pushed to its lowermost position, the projections 12 and 13 will contact each other, leaving a space between the handle 11 and top of cap 2 so an operator's fingers will not be pinched in operating the plunger 8.

The chambers 4 and 5 are in communication as can readily be seen from Figure 2. The ejector gun is built to hold about a quart of liquid which is a sufficient quantity of plant killer in the liquid form to kill the dandelions and undesirable plants in a lawn 100 by 200 feet. The casing 1 may be 1½" to 2" in diameter and from 24" to 36" in length. Two drops of most all liquid plant killer substances is sufficient to kill any undesirable plant if it is entered into the plant at the proper place. Chamber 5 is designed to hold anywhere from two drops to one-tenth of an ounce. The plunger 8 in moving downwardly, enters the second chamber 5 and has a snug fit within chamber 5. The plunger 8 upon first entering chamber 5, closes off communication between chambers 4 and 5 and the plunger 8 in its continued downward movement exerts a pressure on the liquid already in chamber 5 to force it from the chamber 5.

The plunger 8 has connected thereto a means 14 in the form of a second plunger member which plunger means 14 is slidable in the second chamber 5. The second plunger 14 may be connected to the first plunger 8 by any suitable means and Figures 2 and 3 show a bolt member 15 integrally connected with plunger 8 with the bolt 15 also having a sliding fit with the second plunger 14. The bolt 15 has a head 16 which is received in an opening 17 in the second plunger 14. In the uppermost positions of plungers 8 and 14, the bolt head 16 contacts a shoulder in second plunger 14 to hold second plunger 14 over openings 6 and close the same. In the downward movement of plunger 8 in chamber 5, the force on the liquid in chamber 5 exerted by plunger 8, will force second plunger 14 downwardly and bolt 15 will slide through opening 17 before second plunger 14 is forced downwardly. Figure 3 shows the lowermost position of the second plunger 14 seated in the bottom of chamber 5 closing off opening 7 which opening 7 receives bolt member 15. When plunger 8 is pulled upwardly out of second chamber 5, bolt 15 will slide through the second plunger 14 until the head 16 contacts the top of second plunger 14 after which the second plunger 14 will be lifted upwardly into the position of Figure 1 closing off openings 6 again.

In operation of the pump means in an ejector gun, cap 2 is first unloosened from casing 1 and cap 2 and plunger 8 raised upwardly sufficiently to allow chamber 4 to be filled with liquid plant killer substance. When chamber 4 is full, plunger 8 is moved downwardly and cap 2 is attached to casing 1. The ejector gun is now ready for operation. The handle 11 is grasped in one hand and it is carried more or less like a cane. When a plant is discovered that it is desired to kill, the lower pointed end portion 3 is jabbed into the extreme lower portion of the stack, or into the root system. The lower end 3 being more or less like a needle is anchored or supported when jabbed into a plant or into the root system. The operator then pushes downwardly on handle 11 which moves plunger 8 downwardly until it enters chamber 5 which closes off communication between chambers 4 and 5. Bolt 15 is proceeding downwardly all the while within second plunger 14 and the pressure on the liquid in chamber 5 exerted by the downward movement of plunger 8 moves the second plunger 14 downward until it seats in the bottom of chamber 5. The liquid in chamber 5 is forced out of openings 6 into the plant stock or root system. Bolt 15 enters openings 7 and 17 in proceeding downwardly, and the head 16 of bolt 15 forces dirt from both openings and cleans the space. The openings 17 and 7 further allow air to enter back of second plunger 14 and thus insure that no vacuum will be created back of plunger 14 which would tend to hold plunger 14 seated on the bottom of chamber 5. After the liquid is discharged an upward pull is exerted on handle 11 which brings the gun parts back to the position shown in Figure 2 with a continued pull on the handle 11 removing the gun entirely from the plant.

The present pump means has been shown in an injector gun. The gun has a pointed tapered end for the purpose of jabbing the gun into the stack of a plant or its root system. The pointed end could be eliminated and the lower portion of the casing 1 made in any shape desired and the pump put to any number of different uses. The injector gun has been shown as one use having many advantages and from this explanation it is thought that the many other uses that can be made of the pump are obvious.

It is thought from the above the advantages of the present structure are readily apparent and that the objects set forth are attained. While the invention has been described in connection with several specific embodiments, it is to be understood that the words which have been used are words of descriptions rather than limitation, and that practice of the invention within the scope of the appended claims may be resorted to without departing from the true scope of the invention in all its aspects.

I claim:

1. A pump comprising a casing forming a first chamber to hold a liquid and closed at the top thereof, a second chamber in the casing below the first chamber and in communication with the first chamber, a plunger slidable within the casing and extending through the top of the casing with the lower portion of the plunger fitting snugly into the second chamber when moved downwardly and closing off communication between the first and second chambers, an exit from the second chamber to the exterior of the casing, a second plunger member connected to the first mentioned plunger member by a bolt with the second mentioned plunger being slidable on the bolt, said second mentioned plunger being slidable in the second chamber and closing the exit when the first mentioned plunger is in its uppermost position, said second plunger seating in the bottom of the second chamber with the bolt extending through the second plunger member as the first mentioned plunger extends downward to exhaust liquid from the second chamber through the openings and a head on the bolt to lift the second plunger upwardly to close the exit when the first mentioned plunger is in its uppermost position.

2. A pump comprising a casing forming a first chamber to hold a liquid and closed at the top thereof, a second chamber in the casing below the first chamber and in communication with the first chamber, a plunger slidable within the casing and extending through the top of the casing with the lower portion of the plunger fitting snugly into the second chamber when moved downwardly and closing off communication between the first and second chambers, an exit from the second chamber to the exterior of the casing, a second plunger member connected to the first mentioned plunger member by a bolt with the second mentioned plunger being slidable on the bolt, said second mentioned plunger being slidable in the second mentioned chamber and closing the exit when the first mentioned plunger is in its uppermost position, said second mentioned plunger seating in the bottom of the second chamber, an opening in the casing to receive the bolt after it has extended through the second mentioned plunger, said first mentioned plunger extending downwardly to exhaust liquid from the second chamber through the exit and a head on the bolt to lift the second plunger upwardly to close the exit when the first mentioned plunger is in its uppermost position.

3. An injector gun comprising a casing forming a chamber to hold a liquid, said casing being closed at the top thereof with the lower end of the casing being pointed, a second chamber within the lower end of the casing in communication with the first chamber, a plunger slidable within the casing and extending through the top of the casing with the lower portion of the plunger fitting snugly into the second chamber when moved downwardly and closing off communication between the first and second chambers, openings leading from the second chamber to the exterior of the casing to provide an exit from the second chamber, a second plunger member connected to the first mentioned plunger member by a bolt with the second mentioned plunger being slidable on the bolt, said second mentioned plunger being slidable in the second chamber and closing the openings when the first mentioned slidable plunger is in its uppermost position, said second plunger seating in the bottom of the second chamber with the bolt extending through the second plunger member as the first mentioned plunger extends downward to exhaust liquid from the second chamber through the openings and a head on the bolt to lift the second plunger upwardly to close the openings when the first mentioned plunger is in its uppermost position.

4. An injector gun comprising a casing forming a chamber to hold a liquid, said casing being closed at the top thereof by a removable cap member with the lower end of the casing being pointed, a second chamber within the lower end of the casing in communication with the first chamber, a plunger slidably supported within the casing and extending through the removable cap member with the lower portion of the plunger fitting snugly into the second chamber when moved downwardly and closing off communication between the first and second chambers, openings leading from the second chamber to the exterior of the casing to provide an exit from the second chamber, a second plunger member connected to the first mentioned plunger by a bolt with the second mentioned plunger being slidable on the bolt, said second mentioned plunger being slidable in the second chamber and closing the openings when the first mentioned slidable plunger is in its uppermost position, said second plunger seating in the bottom of the second chamber, an opening in the bottom portion of the casing with the bolt extending through the second plunger member and into the opening in the bottom portion, said first mentioned plunger extending downwardly to exhaust liquid from the second chamber through the openings and a head on the bolt to lift the second plunger upwardly to close the openings when the first mentioned plunger is in its uppermost position.

5. A pump comprising a casing forming a first chamber to hold a liquid and closed at the top thereof, a second chamber in the casing below the first chamber, a plunger supported within the first chamber and having a portion of the plunger extending through the top of the casing, the lower portion of the plunger in the extreme upward position of the plunger being removed from the second chamber and being entirely within the first chamber, said lower portion of the plunger in the downward position of the plunger being guided from the first chamber into the second chamber and fitting snugly in the second chamber to close off communication between the first and second chambers, an exit in the housing from the second chamber, a second plunger within the second chamber connected by a bolt with the first plunger, said second plunger closing the exit from the second chamber when the first plunger is entirely within the first chamber and said second plunger moving downwardly to open the exit at the time the first plunger enters the second chamber to close off communication between the first and second chambers.

6. An injector gun comprising a casing forming a first chamber to hold a liquid, said casing closed at the top thereof by a removable cap member with the lower end of the casing being pointed, a second chamber in the casing below the first chamber, a plunger supported within the first chamber and slidable within the first chamber and having a portion of the plunger extending through the removable cap member, the lower portion of the plunger in the extreme upward position of the plunger being removed from the second chamber and being entirely within the first chamber, said lower portion of the plunger in the downward position of the plunger being guided from the first chamber into the second chamber and fitting snugly in the second chamber to close off communication between the first and second chambers, an exit in the housing from the second chamber, a second plunger within the second chamber connected by a bolt with the first plunger, said second plunger closing the exit from the second chamber when the first plunger is entirely within the first chamber and said second plunger moving downwardly to open the exit at the time the first plunger enters the second chamber to close off communication between the first and second chambers.

CHARLES A. MARTIN.

REFERENCES CITED

The following references are of record in the file of this patent:

UNITED STATES PATENTS

| Number | Name | Date |
| --- | --- | --- |
| 951,760 | Foulke et al. | Mar. 8, 1910 |